Nov. 21, 1950 C. P. WEST ET AL 2,531,017

BUS STRUCTURE

Filed Oct. 30, 1946 3 Sheets-Sheet 1

INVENTORS
Charles P. West, Paul R. Pierson,
and Harold H. Rugg.
BY E. M. Crawford
ATTORNEY

BUS STRUCTURE

Filed Oct. 30, 1946 3 Sheets-Sheet 2

WITNESSES:
Wm. B. Sellers.
N. B. Elliott

INVENTORS
Charles P. West, Paul R. Pierson,
and Harold H. Rugg.
BY
G. D. Crawford
ATTORNEY Nov. 21, 1950 C. P. WEST ET AL 2,531,017

BUS STRUCTURE

Filed Oct. 30, 1946 3 Sheets-Sheet 3

WITNESSES:
Wm. B. Sellers.
[signature]

INVENTORS
Charles P. West, Paul R. Pierson, and Harold H. Rugg.
BY G. M. Crawford
ATTORNEY Patented Nov. 21, 1950 2,531,017

UNITED STATES PATENT OFFICE 2,531,017

BUS STRUCTURE

Charles P. West, Harold H. Rugg, and Paul R. Pierson, Pittsburgh, Pa., assignors to Westinghouse Electric Corporation, East Pittsburgh, Pa., a corporation of Pennsylvania Application October 30, 1946, Serial No. 706,570

15 Claims. (Cl. 174—99)

Our invention relates, generally, to electrical bus structures and, more particularly, to metal-enclosed bus structures of the segregated phase type.

An object of our invention, generally stated, is to provide an enclosed bus structure which shall be simple and efficient in operation and which may be economically manufactured and installed.

A more specific object of our invention is to provide an enclosed bus structure in which relatively long sections of bus may be easily installed.

Another object of our invention is to provide for rigidly supporting the conducting members of a bus structure.

A further object of our invention is to provide an enclosed bus structure suitable for conducting relatively large amounts of current at relatively high voltages.

Other objects of our invention will be explained fully hereinafter or will be apparent to those skilled in the art.

In accordance with one embodiment of our invention, a trough which is slightly more than semicircular in cross section is built in sections of a predetermined length. Each section is provided with welded-on stiffeners which also serve as mounting feet for supporting the trough. The bus is supported by pairs of oppositely disposed insulators which are adjustably mounted in the trough. A removable cover is provided for each section of trough and connecting rings are provided at the joints between sections.

For a better understanding of the nature and objects of our invention, reference may be had to the following detailed description, taken in conjunction with the accompanying drawings, in which.

Figure 3:
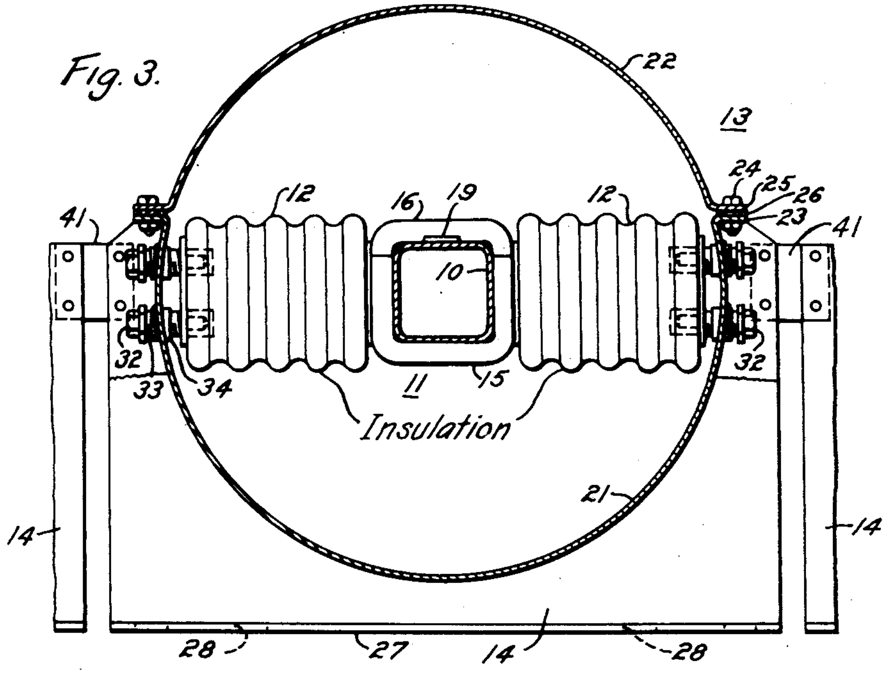
Fig. 3 is an enlarged view, in section, taken along the line III—III of Fig. 2.

Referring to the drawings and, more particularly, to Fig. 3, the structure shown therein comprises a square tubular bus 10, a clamp 11 for the bus 10, a pair of oppositely disposed insulators 12, a housing 13 for enclosing the bus 10, and supporting members 14 which stiffen the housing 13 and also serve as feet for attaching the structure to a supporting wall or framework (not shown). The bus 10 is preferably composed of copper or other suitable conducting material, and the insulators 12 may be composed of porcelain or other suitable insulating material. If desired, a round bus may be utilized in place of the square bus 10.

Figure 4:
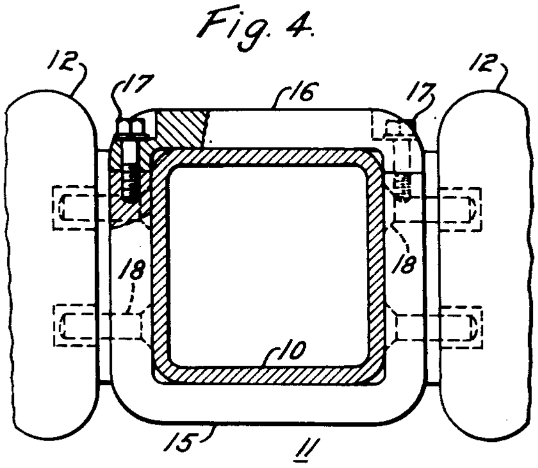
Fig. 4 is an enlarged view, partially in plan and partially in section, of a bus clamp utilized in the bus structure.

As shown more clearly in Fig. 4, the clamp 11 comprises a metal yoke 15 in which the bus 10 is disposed with a sliding fit to permit longitudinal movement of the bus as a result of expansion when it becomes heated. A detachable metal cap 16 is attached to the yoke 15 by bolts 17. The insulators 12 may be attached to the yoke 15 by screws 18.

The bus 10 may be anchored to one set of insulators by securing a small block 19 to the bus 10 on each side of the cap 16 for one of the yokes. Thus, the bus 10 is prevented from shifting its position in the bus structure, but is free to expand and contract longitudinally since it is anchored at only one point.

As shown in Fig. 3, the housing 13 comprises a trough 21 which is slightly greater than a semi-circle in a cross section and a flanged cover 22 which is removably attached to flanges 23 on the trough 21. The cover 22 may be attached by bolts 24 which extend through flanges 25 and 23 on the cover 22 and the trough 21, respectively. Suitable gaskets 26 may be provided between the flanges 23 and 25, thereby making the housing of a dust-tight construction.

Figure 1:
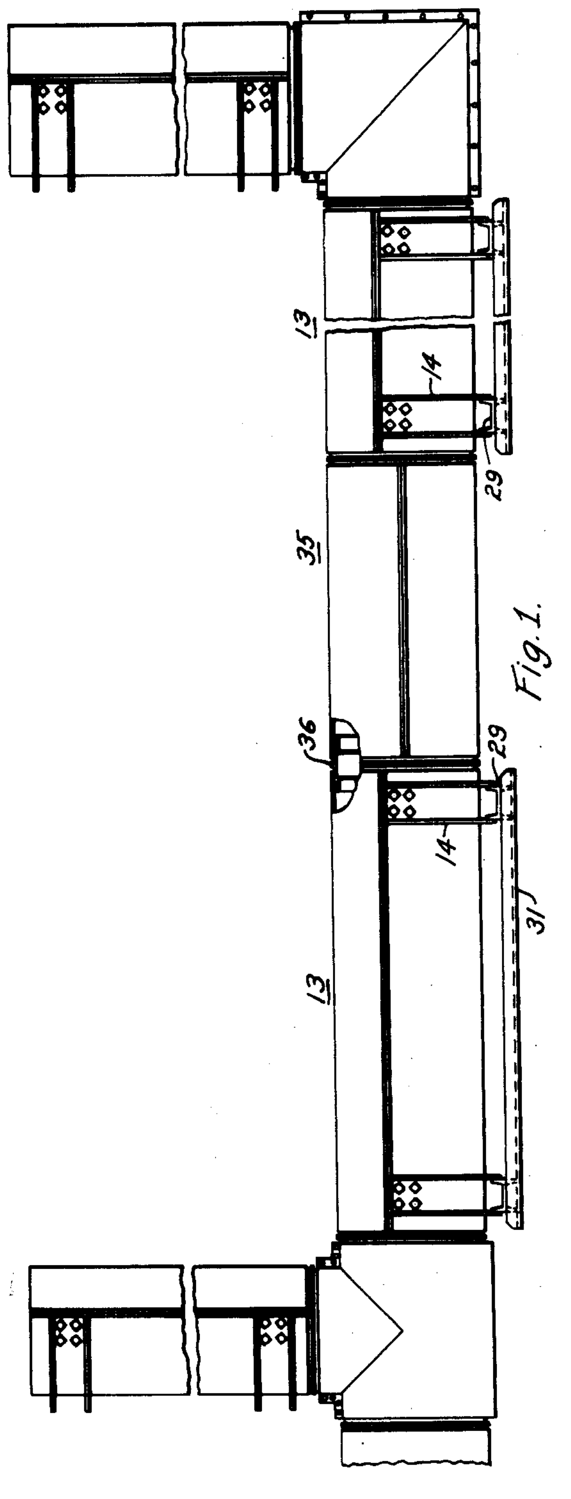
Figure 1 is a view, in side elevation, of a bus structure embodying the principal features of our invention.
Figure 2:
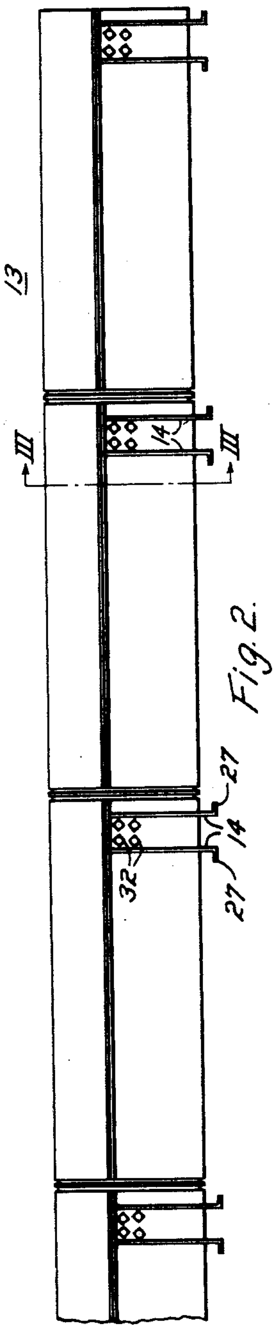
Fig. 2 is a view, in side elevation, of a slightly modified form of bus structure.

The supporting members 14 are preferably composed of sheet metal and each member has a curved surface which engages the curved outer surface of the trough 21. As shown in Figs. 2 and 3, each supporting member 14 is provided with a flange or foot 27 having openings 28 therein for attaching the supporting members to a suitable supporting structure. The supporting members 14 are disposed in pairs, the members of each pair being disposed on opposite sides of each pair of insulators 12. The members 14 are preferably welded to the trough 21. As shown in Figure 1, the feet 27 may be omitted from the supporting members 14 and each pair of members may be attached to an H or channel-shaped bar 29, which in turn may be attached to a supporting structure 31.

As shown in Figs. 1, 2 and 3, each insulator 12 is adjustably attached to the trough 21 by means of stud bolts 32 which are threaded into the insulator 12 through bushings 33. The bushing 33 for each stud bolt is threaded through a collar 34 which is disposed in an opening in the trough 21 and is welded to the trough. Thus, the insulators 12 may be securely held in position by properly adjusting the bushings 33 and the stud bolts 32. As explained hereinbefore, the supporting plates 14 function to stiffen the trough 21 where the insulators are connected to the trough.

Figure 6:
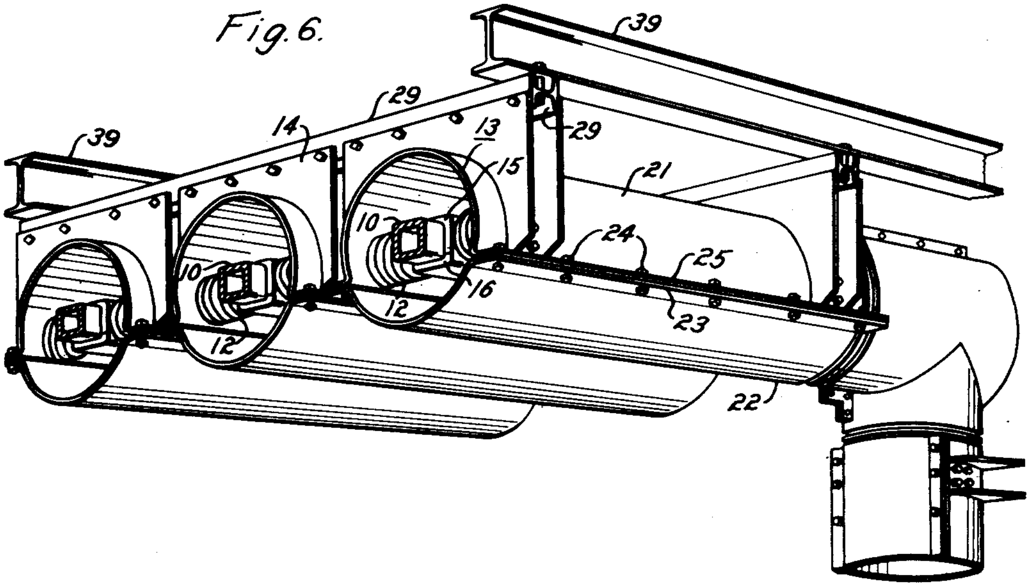
Fig. 6 is a view, in perspective, of a portion of a three-phase bus structure.
Figure 7:
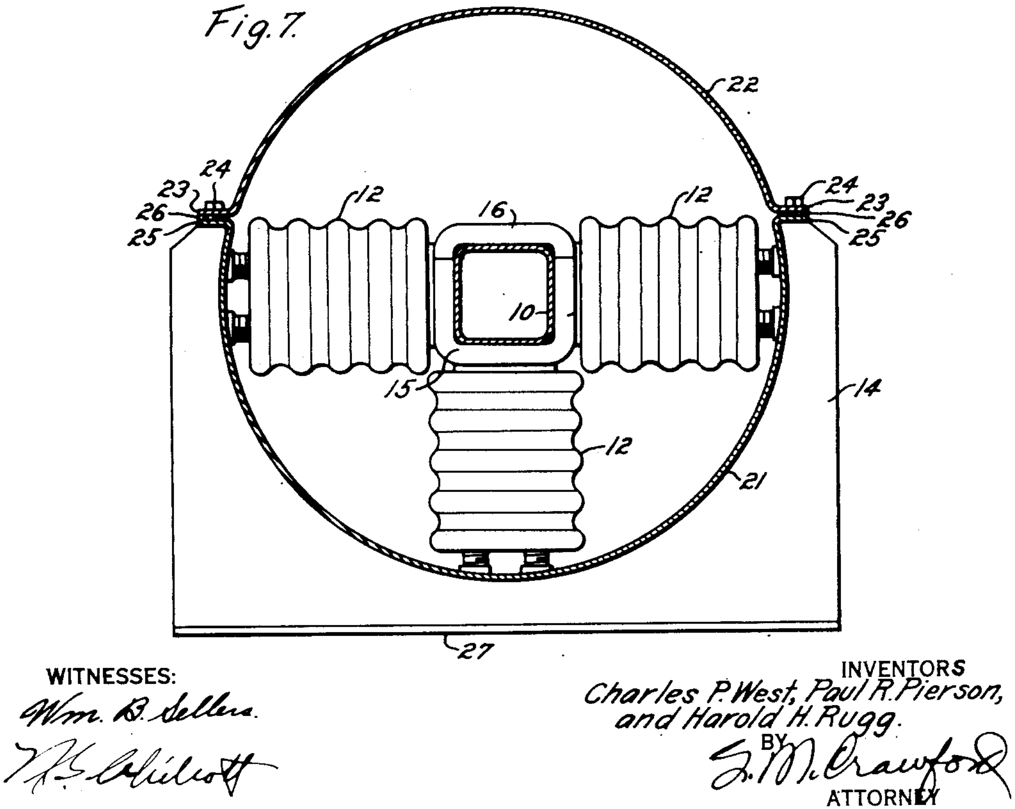
Fig. 7 is a view similar to Fig. 3, showing a modification of the invention.

As shown in Fig. 6, the pairs of opposed insulators in a three-phase structure are preferably mounted with their axes in a direction of the stresses arising from the forces incident to short circuit conditions in the bus structure. Ordinarily, only two insulators will be required at each point of support for the bus. However, if desired, a third insulator may be disposed at right angles to the oppositely disposed insulators, as shown in Fig. 7. The third insulator may be connected to the yoke 15 and the trough 21 in the manner shown in Fig. 7.

As shown in Figs. 1 and 2, the housing 13 may be constructed in sections of a predetermined length. Each section may be provided with two pairs of supporting members 14 and insulators 12, as shown in Figure 1, or each section may be provided with only one pair of supporting members and insulators, as shown in Fig. 2.

The sections having only one pair of supporting members may be disposed end-to-end with the supporting members being located at regular intervals as shown in Fig. 2. The sections having two pairs of supporting members may be utilized in structures having T and L connections as shown in Figure 1. A spacing sleeve 35 comprising semicircular halves may be utilized to fill in the space between adjacent sections of the housing 13 when there is not sufficient space to utilize one of the sections of a standard length. The spacing sleeve 35 need not be provided with any supporting members.

Figure 5:
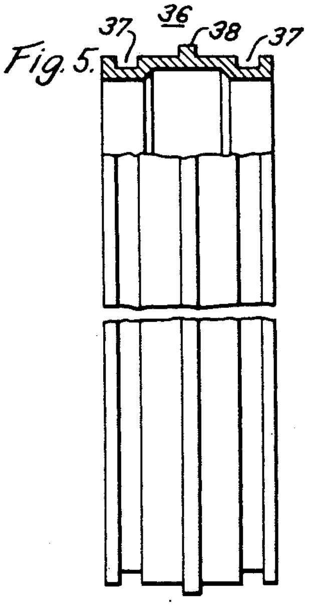
Fig. 5 is an enlarged view, partially in plan and partially in section, of a connecting ring utilized at the joints in the housing for the bus.

A connecting ring 36 is provided at each joint between housing sections. As shown most clearly in Fig. 5, the connecting ring 36 is provided with grooves 37 in which suitable gaskets may be placed and a raised rib 38 which is disposed between the ends of the housing sections. In this manner, a tight joint may be made between the housing sections.

As shown in Fig. 6, the supporting members 14 for all three housings of a three-phase structure may be attached to common H bars 29, thereby constituting a unitary three-phase structure. This unitary structure may be attached to a suitable structural framework comprising bars 39, as shown. In this manner, a strong and rigid structure may be provided.

The structure shown in Fig. 3 may be strengthened by connecting the supporting members 14 for adjacent phases by means of plates 41. Thus the supporting members for all three-phases of a three-phase structure may be connected together, thereby tending to equalize the stresses imposed upon any one set of supporting members.

It will be seen that when the covers 22 of the housing are removed, it is possible to place relatively long sections of bus into the mounting supports, it being understood that the required number of connecting rings 36 are threaded onto the bus and spaced at the desired intervals before the bus is installed. In this manner, the cost of erecting a bus structure of the present type may be materially reduced. Where suitable handling facilities are available, three-phase units of bus structure, such as shown in Fig. 6, may be assembled before being finally installed.

From the foregoing description, it is apparent that we have provided a bus structure which is suitable for the transmission of relatively large amounts of current at relatively high voltages. The structure may be readily assembled with the power conductors disposed in either vertical or horizontal planes and T or L connections may be readily made to the structure where desired.

Since certain changes may be made in the above-described construction and different embodiments of the invention may be made without departing from the spirit and scope thereof, it is intended that all the matter contained in the foregoing description or shown in the accompanying drawings shall be considered as illustrative and not in a limiting sense.

We claim as our invention:

1. A bus structure comprising a bus, a curved housing for the bus, combined supporting and stiffening members secured to and encircling more than half of the outside diameter of the housing at regular intervals, and insulating members attached directly to the encircled portion of the housing between the supporting members to support said bus.

2. A bus structure comprising a bus, a curved housing for the bus, combined supporting and stiffening members secured to and encircling at least half of the outside diameter of the housing at regular intervals, and oppositely disposed insulating members attached to the encircled portion of the housing to support the bus, and bolts extending through the housing and accessible from the exterior of the housing for adjustably supporting the insulating members.

3. A bus structure comprising a bus, a curved housing for the bus, combined supporting and stiffening members secured to and encircling at least half of the outside diameter of the housing at regular intervals, oppositely disposed insulating members adjustably attached directly to the encircled portion of the housing to support the bus, threaded bushings disposed in the housing, and bolts extending through said bushings into the insulating members to support the insulating members.

4. A bus structure comprising a bus, a trough for the bus, said trough having a curved surface, combined supporting and stiffening members disposed edgewise to the trough and having curved surfaces substantially coextensive with and secured to the curved surface of the trough, insulating members attached to the trough to support the bus, a cover removably attached to the trough, and bolts extending through the trough into the insulating members to support the insulating members.

5. A bus structure comprising a bus, a trough for the bus, said trough having a curved surface, combined supporting and stiffening members disposed edgewise to the trough and having curved surfaces substantially coextensive with and secured to the curved surface of the trough, insulating members adjustably attached directly to the trough to support the bus, a cover removably attached to the trough, and bolts extending through the trough adjacently to the supporting members for supporting the insulating members.

6. A bus structure comprising a bus, a trough for the bus, said trough having a curved surface, combined supporting and stiffening members disposed edgewise to the trough and having curved surfaces substantially coextensive with and secured to the curved surface of the trough, insulating members attached directly to the trough between the supporting members to support the bus, and a cover removably attached to the trough.

7. A bus structure comprising a bus, a trough for the bus, said trough having a curved surface, combined supporting and stiffening members disposed edgewise to the trough and having curved surfaces substantially coextensive with and secured to the curved surface of the trough, and oppositely disposed insulating members attached to the trough adjacently to the supporting members to support the bus, and a cover removably attached to the trough.

8. In a bus structure, in combination, a bus, a plurality of greater than semicircular trough sections disposed end-to-end for the bus, a pair of combined supporting and stiffening members disposed edgewise to and secured to each trough section near one end thereof, insulating members attached to the trough sections between each pair of supporting members to support the bus, a cover removably attached to each trough section, and rings disposed at the joints between sections for supporting the ends of the sections opposite said supporting members.

9. In a bus structure, in combination, a bus, a plurality of greater than semicircular trough sections disposed end-to-end for the bus, a pair of combined supporting and stiffening members disposed edgewise to and secured to each trough section near one end thereof, said supporting members having curved surfaces engaging the trough sections, insulating members attached to the trough sections between each pair of supporting members to support the bus, a cover removably attached to each trough section, and rings disposed at the joints between sections for supporting the ends of the sections opposite said supporting members.

10. In a bus structure, in combination, a bus, a plurality of greater than semicircular trough sections disposed end-to-end for the bus, a pair of combined supporting and stiffening members disposed edgewise to and secured to each trough section near one end thereof, insulating members attached to the trough sections between each pair of supporting members to support the bus, a cover removably attached to each trough section, said covers completing circular housing sections for the bus, and rings disposed at the joints between sections for supporting the ends of the sections opposite said supporting members.

11. In a bus structure, in combination, a bus, a plurality of circular housing sections for the bus, combined supporting and stiffening members secured to and encircling more than half of the outside diameter of the housing sections, insulating members adjustably attached directly to the encircled portion of the housing sections to support the bus, and a circular connecting ring disposed at each joint between housing sections.

12. In a bus structure, in combination, a bus, a trough for the bus, said trough having a curved surface, combined supporting and stiffening members disposed edgewise to the trough and having curved surfaces substantially coextensive with and secured to the curved surface of the trough, a pair of oppositely disposed insulating members attached to the trough, a third insulating member attached to the trough and disposed at right angles to said first-named insulating members to cooperate with them in supporting the bus, and a cover removably attached to the trough.

13. In a bus structure, in combination, a bus, a greater than semicircular trough for the bus, a pair of combined supporting and stiffening members disposed edgewise to and secured to the trough, each supporting member having a curved surface substantially coextensive with the outer surface of the trough, a pair of oppositely disposed insulating members adjustably attached directly to the trough between the pair of supporting members, a third insulating member disposed at right angles to the first-named insulating members and adjustably attached to the trough to cooperate with them in supporting the bus, and a cover removably attached to the trough.

14. In a bus structure, in combination, a bus, a clamp for the bus, said clamp having a detachable cap, a circular housing for enclosing the bus, combined supporting and stiffening members secured to and encircling more than half of the outside diameter of the housing, and insulating members adjustably attached to the encircled portion of the housing and to the clamp to support the bus, said housing having a removable cover to permit removal of the bus by detaching the cap from said clamp.

15. In a bus structure, in combination, a bus, a clamp for the bus, said clamp having a detachable cap, a trough for the bus and clamp, combined supporting and stiffening members secured to and partially encircling the outside of the trough, oppositely disposed insulating members adjustably attached to the trough and to the clamp to support the bus, and a cover removably attached to the trough to permit removal of the bus by detaching the cap from said clamp.

CHARLES P. WEST.
HAROLD H. RUGG.
PAUL R. PIERSON.

REFERENCES CITED

The following references are of record in the file of this patent:

UNITED STATES PATENTS

| Number | Name | Date |
|---|---|---|
| 1,934,434 | LeClair | Nov. 7, 1933 |
| 2,039,793 | Harvey | May 5, 1936 |
| 2,084,580 | Frank | June 22, 1937 |
| 2,144,247 | Scott | Jan. 17, 1939 |
| 2,293,310 | Rudd | Aug. 18, 1942 |
| 2,310,919 | Adam | Feb. 16, 1943 |